United States Patent Office 3,291,791
Patented Dec. 13, 1966

3,291,791
PROCESS FOR PREPARING 3-LOWER ALKANOYL-OXY AND 3-BENZOYL-OXY 5-PHENYL-1,3-DI-HYDRO-2H-1,4-BENZO-DIAZEPIN-2-ONES
Earl Reeder, Nutley, and Leo Henryk Sternbach, Upper Montclair, N.J., assignors to Hoffmann-La Roche, Inc., Nutley, N.J., a corporation of New Jersey
No Drawing. Filed June 23, 1964, Ser. No. 377,405
4 Claims. (Cl. 260—239.3)

3-lower alkanoyl-oxy and 3-benzoyl-oxy 5-phenyl-1,3-dihydro-2H-1,4-benzodiazepin-2-ones are a known class of organic compounds valuable both by virtue of their pharmacological activity and by virtue of their ability to undergo hydrolysis to corresponding 3-hydroxy compounds.

More particularly, these desired 3-lower alkanoyl-oxy and 3-benzoyl-oxy compounds are of the formula

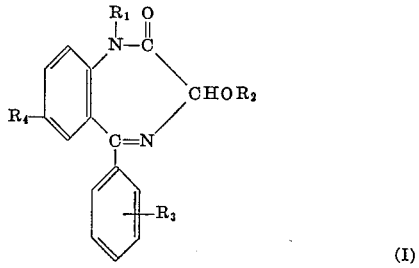

(I)

wherein $R_1$ is selected from the group consisting of hydrogen and lower alkyl; $R_2$ is selected from the group consisting of lower alkanoyl and benzoyl; $R_3$ is selected from the group consisting of hydrogen, halogen and trifluoromethyl; and $R_4$ is selected from the group consisting of hydrogen, halogen, trifluoromethyl, nitro, lower alkylthio and lower alkyl.

This invention involves a facile process for the preparation of compounds of Formula I from starting materials of the formula

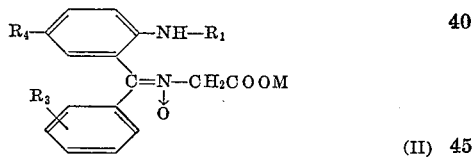

(II)

wherein $R_1$, $R_3$ and $R_4$ have the same meaning as above; and M is selected from the group consisting of hydrogen, alkali metals and earth alkali metals.

More particularly, this invention comprises a process for the preparation of a compound of Formula I which comprises treating a compound of the Formula II with an acylating agent selected from the group consisting of lower alkanoyl anhydride, benzoyl anhydride, lower alkanoyl halide, benzoyl halide, di-lower alkanoyl sulfide and di-benzoyl sulfide.

Temperature is not critical to the success of the above process and temperatures above, below, or at room temperature can be used. Of course, for any given set of reactants, it will be preferred to operate at certain specific temperatures in order to obtain optimum yields. The selection of these specific temperatures is well within the skill of those in the art. Similarly, the acylating agent can be used in any concentration, but it is advantageous to use an excess of the acylating agent. Moreover, the reaction is suitably conducted in an anhydrous medium. In a preferred embodiment, the reaction medium is the acylating agent, itself. However, it is also suitable to conduct the reaction in an inert organic solvent such as, for example, dimethylformamide, pyridine, ethers such as, ether, itself, diglym, hydrocarbons, for example, aromatic hydrocarbons such as, benzene, xylene, toluene, halogenated hydrocarbons such as, methylene chloride, and the like.

As used herein, the term "lower alkyl" comprehends both branched and straight chain hydrocarbon groups such as, methyl, ethyl, propyl, isopropyl, and the like. Similarly, the term "lower alkanoyl" comprehends such groups as acetyl, propionyl, and the like. The term "halogen" includes all four halogens, i.e., iodine, bromine, chlorine, and fluorine, but the latter three are preferred. "Alkali metals" refers to monovalent elements such as, lithium, sodium, potassium, and the like; and, "earth metals" refers to divalent elements such as, calcium, barium, and the like.

The following example is illustrative but not limitative of the invention. All temperatures are in degrees centigrade.

Example 1

A solution of 6.8 g. of the potassium salt of N-(2-amino-5-chlorobenzhydrylidene)glycine N-oxide in a mixture of 50 ml. of pyridine and 50 ml. of acetic anhydride was left at room temperature for 17 hours. The mixture was then concentrated in vacuo to dryness. The so-obtained residue was dissolved in methylene chloride and washed with cold dilute sodium hydroxide. The organic layer was separated, dried and concentrated in vacuo to dryness. The residue was crystallized from acetone and yielded crude reaction product which was crystallized from acetone giving 3-acetoxy-7-chloro-5-phenyl-1,3-dihydro-2H-1,4-benzodiazepin-2-one as colorless prisms melting at 234–239° (uncorrected).

We claim:
1. A process for the preparation of a compound of the formula

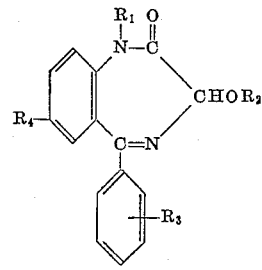

wherein $R_1$ is selected from the group consisting of hydrogen and lower alkyl; $R_2$ is selected from the group consisting of lower alkanoyl and benzoyl; $R_3$ is selected from the group consisting of hydrogen, halogen and trifluoromethyl; and $R_4$ is selected from the group consistng of hydrogen, halogen, trifluoromethyl, nitro, lower alkylthio and lower alkyl;
which comprises treating a compound of the formula

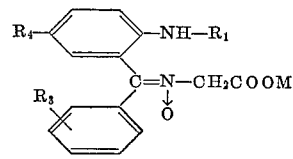

wherein $R_1$, $R_3$ and $R_4$ have the same meaning as above; and M is selected from the group consisting of hydrogen, alkali metals and earth alkali metals;
with an acylating agent selected from the group consisting of lower alkanoyl anhydride, benzoyl anhydride, lower alkanoyl halide, benzoyl halide, di-lower alkanoyl sulfide and di-benzoyl sulfide.

2. A process for the preparation of 3-lower alkanoyl-oxy - 1,3 - dihydro - 7 - chloro - 5 - phenyl - 2H - 1,4-benzodiazepin-2-one which comprises treating an alkali or earth alkali metal salt of N-(2-amino-5-chlorobenzhydrylidene)glycine N-oxide with lower alkanoyl anhydride.

3. A process for the preparation of 3-acetoxy-1,3-dihydro - 7 - chloro - 5 - phenyl - 2H - 1,4-benzodiazepin - 2-one which comprises treating an alkali metal salt of N-(2-amino-5-chlorobenzhydrylidene)glycine N-oxide with acetic anhydride.

4. A process for the preparation of 3-acetoxy-1,3-dihydro - 7 - chloro - 5 - phenyl - 2H - 1,4 - benzodiazepin- 2-one which comprises treating an earth alkali metal salt of N-(2-amino - 5 - chlorobenzhydrylidene)glycine N - oxide with acetic anhydride.

No references cited.

WALTER A. MODANCE, *Primary Examiner.*

R. T. BOND, *Examiner.*